(12) United States Patent
Willey et al.

(10) Patent No.: US 11,158,889 B2
(45) Date of Patent: Oct. 26, 2021

(54) APPARATUSES AND METHODS FOR ACOUSTIC AND CURRENT MANIPULATION OF ANODE INTERFACE DEPOSITS IN LITHIUM ANODE BATTERIES AND OTHER BATTERY SYSTEMS

(71) Applicant: RFNAV Inc., Glenelg, MD (US)

(72) Inventors: Jefferson M. Willey, Glenelg, MD (US); Richard E. Pavek, Marble Falls, TX (US); James H. Schoenduve, Hansville, WA (US)

(73) Assignee: RFNAV Inc., Glenelg, MD (US)

( * ) Notice: Subject to any disclaimer, the term of this patent is extended or adjusted under 35 U.S.C. 154(b) by 0 days.

(21) Appl. No.: 17/060,980

(22) Filed: Oct. 1, 2020

(65) Prior Publication Data

US 2021/0104785 A1 Apr. 8, 2021

Related U.S. Application Data

(60) Provisional application No. 62/911,350, filed on Oct. 6, 2019, provisional application No. 62/706,834, filed on Sep. 13, 2020.

(51) Int. Cl.
*H01M 10/48* (2006.01)
*G01N 29/06* (2006.01)
(Continued)

(52) U.S. Cl.
CPC ...... *H01M 10/488* (2013.01); *G01N 29/0654* (2013.01); *H01M 10/4235* (2013.01);
(Continued)

(58) Field of Classification Search
CPC ........... H01M 10/488; H01M 10/4235; H01M 10/484; H02J 7/0069; G01N 29/0654; G01N 2291/0231
See application file for complete search history.

(56) References Cited

U.S. PATENT DOCUMENTS 9,739,881 B1 8/2017 Pavek
9,903,946 B2 2/2018 Willey et al.
(Continued)

FOREIGN PATENT DOCUMENTS

EP 3279993 2/2018

OTHER PUBLICATIONS

Vorobyov, S., "Principles of minimum variance robust adaptive beamforming design," Signal Processing, vol. 93, Issue 12, pp. 3264-3277, Dec. 2013. DOI: 10.1016/j.sigpro.2012.10.021.
(Continued)

*Primary Examiner* — Jimmy Vo
(74) *Attorney, Agent, or Firm* — Law Office of Michael Antone; Michael Antone

(57) ABSTRACT

Improved battery systems, apparatuses, and methods for use in electric air, land, and marine vehicles and mobile, portable, and stationary electrical appliances and devices are provided. The systems employ acoustic and current manipulation of anode interface deposits including dendrites on or proximate lithium and other anodes. This invention may employ multistatic ultrasonic phased arrays and current modulation to 1) minimize deposit, e.g., dendrite, initiation and formation by acoustic stirring, 2) acoustically image dendritic growths to monitor changes in dendrite growths, 3) cue dendrite cleaning and battery shutdown to avoid short circuit, 4) induce failure in dendritic structure and shearing of at least a portion of the dendrite from the anode, and 5) transport sheared dendrites and other dead metal to a graveyard.

29 Claims, 14 Drawing Sheets

(51) Int. Cl.
*H02J 7/00* (2006.01)
*H01M 10/42* (2006.01)

(52) U.S. Cl.
CPC ......... *H01M 10/484* (2013.01); *H02J 7/0069* (2020.01); *G01N 2291/0231* (2013.01)

(56) References Cited

U.S. PATENT DOCUMENTS

| | | | |
|---|---|---|---|
| 2009/0155678 | A1 | 6/2009 | Less |
| 2017/0179538 | A1* | 6/2017 | Christensen ......... G01R 31/396 |
| 2017/0338465 | A1 | 11/2017 | Holme |
| 2018/0287219 | A1 | 10/2018 | Sood |
| 2019/0237818 | A1 | 8/2019 | Friend et al. |

OTHER PUBLICATIONS

Xu, C., et. al., "Enhanced strength and temperature dependence of mechanical properties of Li at small scales and its implications for Li metal anodes," PNAS, vol. 114, No. 1, pp. 57-61, 2017.

Yang, Y., et. al., "An Ultra-High Element Density pMUT Array with Low Crosstalk for 3-D Medical Imaging", Sensors 13(8), 9624-9634, 2013.

Zou, P., et. al., "Directing lateral growth of lithium dendrites in micro-compartmented anode arrays for safe lithium metal batteries," Nature Communications, 9:464, 2018.

Aryanfar, A., et. al., "Annealing kinetics of electrodeposited lithium dendrites," Journal of Chemical Physics, vol. 143, 132701, 2015.

Bai, P., et al, "Transition of lithium growth mechanisms in liquid electrolytes," Energy Environ. Sci. vol. 9, pp. 3221-3229, 2016.

Bai, P., et. al., "Interactions between lithium Growths and Nanoporous Ceramic Separators", Joule, vol. 2, pp. 1-16, Nov. 21, 2018.

Chen, K-H, et al, "Dead lithium: mass transport effects on voltage, capacity, and failure of lithium metal anodes," J. Mater. Chem. A, vol. 5, pp. 11671-11681, 2017. DOI: 10.1039/c7ta00371d.

Citrin, M., et al, "From ion to atom to dendrite: Formation and nanomechanical behavior of electrodeposited lithium," MRSBulletin, Cambridge University Press, Jul. 9, 2020. doi.org/10.1557/mrs.2020.148.

Jiang, X., "Monolithic 591+438 DPI ultrasonic fingerprint sensor," Proceedings of the 2016 IEEE 29th International Conference on Micro Electro Mechanical Systems, Jan. 24-28, 2016. DOI: 10.1109/MEMSYS.2016.7421569.

LePage, W., et al, "Lithium Mechanics: Roles of Strain Rate and Temperature and Implications for Lithium Metal Batteries," Journal of The Electrochemical Society, vol. 166, No. 2, A89-A97, 2019.

Li, L., et al, "Self-heating—induced healing of lithium dendrites," Science, vol. 359, pp. 1513-1516, 2018. DOI: 10.1126/science.aap8787.

Marzoa, A., et al, "Holographic acoustic tweezers", PNAS, vol. 116, No. 1, pp. 84-89, Jan. 2, 2019.

Peled E., et al, "Review—SEI: Past, Present and Future," Journal of the Electrochemical Society, vol. 164, A1703-A1719, 2017.

Steiger, J. "Mechanisms of Dendrite Growth in lithium Metal Batteries", PhD Thesis, Jan. 15, 2015.

Jan. 27, 2021 ISR & WO for corresponding PCT App. No. PCTUS2053768.

* cited by examiner

APPARATUSES AND METHODS FOR ACOUSTIC AND CURRENT MANIPULATION OF ANODE INTERFACE DEPOSITS IN LITHIUM ANODE BATTERIES AND OTHER BATTERY SYSTEMS

CROSS-REFERENCE TO RELATED APPLICATIONS

The application claims the benefit of and priority to U.S. Provisional Patent Application Ser. Nos. 62/911,350 filed Oct. 6, 2019 and 62/706,834, filed Sep. 13, 2020, each of which is incorporated herein by reference in its entireties.

BACKGROUND OF THE INVENTION

Field of the Invention

The present invention generally relates to batteries and electric vehicles and electrical devices including batteries with improved performance. More specifically, the present invention is directed to battery systems, apparatuses and methods and electric vehicle and electrical device including batteries and battery systems that enable control of dendritic growths and other deposits on the anode, such as lithium and graphite anodes, using acoustic energy and current density modulation.

Background Art

Modern society is increasingly become location independent. This trend has accelerated as a result of the Covid-19 pandemic. Location independence is fueled by many technological advances including wireless communication and battery technologies. The pace of this trend is dependent upon continued improvements in battery technology.

Lithium anode batteries have the potential to deliver both high specific energy and high energy density. However, the full potential of Li-metal anode batteries has been difficult to achieve due to electrodeposits generally, and dendritic growths specifically, that form during the charge cycle resulting in reduced Coulombic and energy efficiency. Further, when dendritic growths bridge between anode and cathode the battery cell short-circuits to thermal runaway and potential ignition of the electrolyte.

Lithium ion deposition is ideally uniform across the solid electrolyte interphase (SEI) region of the anode during the charging cycle. Dendrite formation is known to be initiated by surface inhomogeneities, defects, contaminants, and electro-chemical gradients that depart from their ideal configuration.

Despite decades of persistent research, the dendritic growth problem remains. One approach is to mechanically block dendrite growth. One method replaces the liquid electrolyte with a strong solid polymer. The objective is to select an electrochemical compatible solid polymer whose shear modulus is higher than crystalline lithium. Another approach has been to apply an external mechanical force antipodal to the path of dendritic growths.

The mechanical approaches to block dendritic growths have had limited success. Electro-deposited crystalline lithium pillars with <1 micron diameter have an average shear modulus greater than 6 MPa and an average yield stress 16 MPa. To block these forces the nanopore separator and the base bulk lithium anode must have superior and uniform mechanical properties across its surface to avoid anode deformation that leads to the formation of deposit growths and dendrites.

Another approach introduces acoustic waves to promote mixing and homogenization of the electrolyte in an attempt to slow dendritic growths. Unfortunately, both active and inactive electrodeposits continue to form, reducing battery capacity and Coulombic efficiency.

The persistent problem of dendrites is not limited to Li-metal anode batteries. As such, there is a continuing need for batteries with higher efficiencies and a longer functional life. This need for improved battery performance continues to grow more acute with each day as society becomes more mobile, relying on electronic devices that depend upon the performance of batteries.

BRIEF SUMMARY OF THE INVENTION

The present invention addresses the above noted needs for battery systems, apparatuses, and methods with improved performance that enable higher performance battery powered electric air, land, and marine vehicles and mobile, portable, and stationary electrical appliances and devices. Systems, apparatuses and methods of the present invention employ acoustic energy and current density modulation to induce and promote dendrite structural failure and detachment from the anode and/or solid electrolyte interface. In addition, the acoustic energy may be employed to stir the electrolyte, image and locate both active and inactive deposits, detach or shear connected deposits from the anode, and transport the sheared deposits to a location that decreases the disruption of efficient ion diffusion.

Apparatuses may employ multistatic ultrasonic phased arrays and current density modulation. The methods may include beam steering to arbitrarily position and sweep, or oscillate, acoustic generated pressure traps in a 3D volume. Simultaneously, current density control induces crystalline defects and softening during electrodeposition to facilitate dendrite shearing.

The present invention may be used with batteries in which electrodeposits form during the charging cycle. The systems and apparatuses may implement one or more of the following processes to reduce the impact on dendritic growth on battery performance:
1. stirring of the electrolyte to minimize dendritic initiation and formation,
2. imaging dendritic growths to,
   a. monitor changes in dendrite growths,
   b. cue dendrite cleaning,
   c. cue battery shutdown to avoid short circuit,
3. inducing failure in, and removal, of dendritic growths sheared, or disconnected, from the anode, and
4. transporting sheared, or disconnected, growths from the anode region to improve ion diffusion relative to the anode, 3D imaging of electrodeposits and growths on the anode and in the electrolyte above the anode and below the nanopore separator may be performed. Acoustic energy may be used to oscillate a pressure trap, formed with steep pressure gradients, around the dendrites, resulting in deposit disconnection from the anode.

The processor may control one or more electronically steered ultrasonic arrays to image, monitor, and attain a clear transport path to a graveyard for disconnected deposits by steering pressure traps to avoid disruption to the solid electrolyte interface and to locate, transport, and track disconnected deposits, e.g., dead lithium, to the graveyard to maintain ion diffusion and minimize the loss of battery cell capacity. The pressure traps that may be located anywhere in the 3D field of view of the electronically steered ultrasonic arrays and may have customizable depth, breadth, and pressure gradients.

The electronically steered ultrasonic arrays may have steering vector formation methods that include near-field steering, and adaptive beamforming methods to make arbitrarily wide null beams by multistatic intersections of the null beams and to reduce local minima and artifacts by application of a fast-time common mode phase shift offset to one more multistatic steering vectors.

The electronically steered ultrasonic arrays may be a single, multistatic, and/or conformal electronically steered piezo-electric micromachined ultrasonic transducers arrays. Multiple electronically steered multistatic ultrasonic arrays may be used to compensate for dendrite blockages by Boolean association of geographically diverse subarrays exploiting the sparseness of convolution, time domain MIMO, etc.

While the description may focus primarily on exemplary lithium-metal and graphite anode batteries, the systems, apparatuses, and methods are applicable to any battery cathode/anode liquid electrolyte system that exhibits charge cycle electrodeposition on the anode, such as battery systems based on lithium, potassium, sodium, magnesium, copper, or zinc ions. Anode types include bulk lithium, graphite, graphite combined with silicon-metal alloys such as $SiO_x$, $TiO_x$, and $NiO_x$, and transition metal oxides, such as $Cr_2O_3$, $MnO_2$, $Fe_2O_3$, $Co_3O_4$, CuO. Cathodes types include lithium nickel cobalt manganese oxide (NMC), lithium iron phosphate (LFP), lithium nickel manganese spinel (LNMO), lithium nickel cobalt aluminum oxide (NCA), lithium manganese oxide (LMO), and lithium cobalt oxide (LCO).

Accordingly, the present disclosure addresses the continuing need for batteries with improved performance and longer useful life.

BRIEF DESCRIPTION OF THE DRAWINGS

The accompanying drawings are included for the purpose of exemplary illustration of various aspects of the present invention to aid explanation and understanding, and not for purposes of limiting the invention, wherein.

Figure 1:
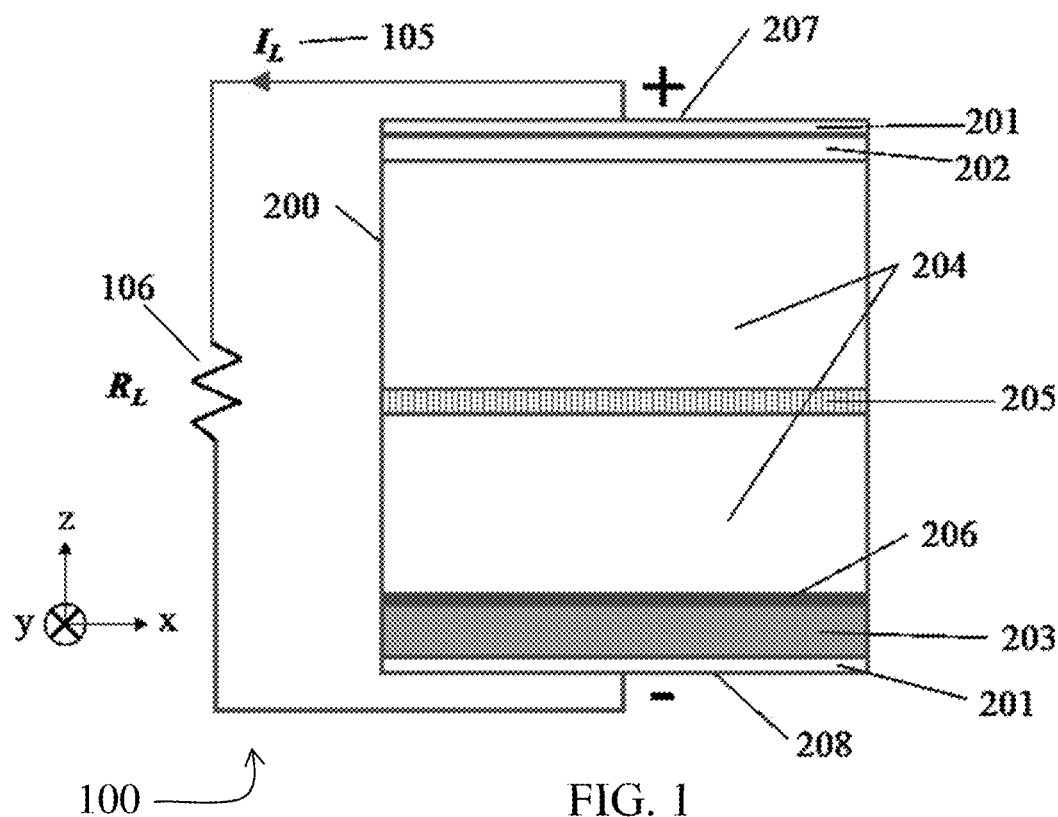
FIG. 1 shows an exemplary battery system including a battery cell and its components in a discharge circuit.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

FIG. 1 shows an exemplary battery system 100 including a battery 200 with nominal battery components in a discharge circuit. Current 105 $I_L$ flows from a positive terminal 207 with a current collector 201 passing positive charges from positive electrode (cathode) 202. An electrolyte 204 is positioned between a nanopore separator 205 and a positive electrode 202, as well as between the 205 nanopore separator and the solid electrolyte interphase (SEI) 206 on top of a negative electrode (anode) 203, which interfaces with the current collector 201 with connection to an external circuit and load $R_L$ 106 through a negative terminal 208. The load $R_L$ 106 may be any type of system, subsystem, apparatus, or device designed to operate on battery power, such as electric air, land, and marine vehicles and mobile, portable, and stationary electrical devices, e.g., computers, tablets, phones, appliances, equipment, systems, etc., and portions thereof.

Figure 2:
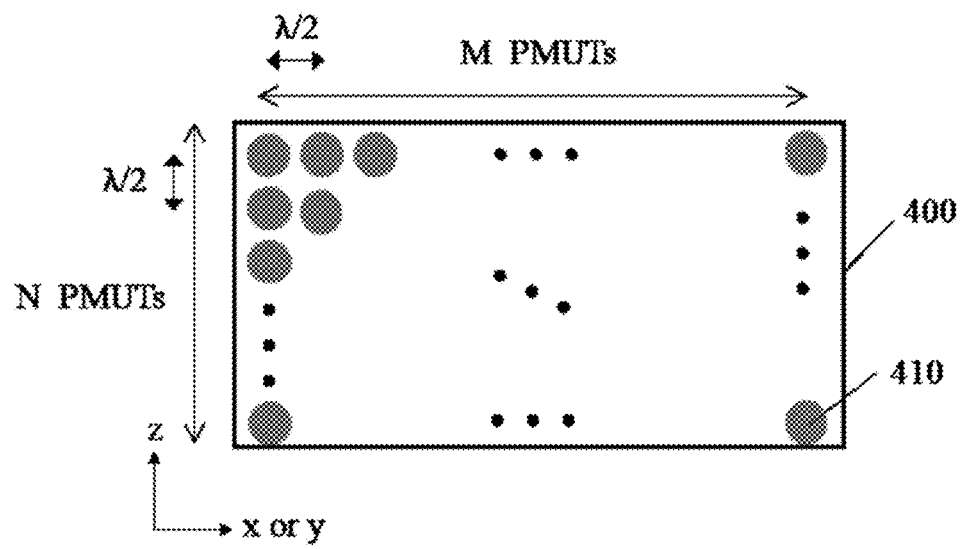
FIG. 2 s an exemplary electronically steered ultrasonic 2D array.

In various embodiments, the battery 200 may include electronically steered ultrasonic arrays (ESUA) 400, as shown in FIG. 2. An exemplary implementation of the 400 ESUA is a 2D array of piezo-electric micromachined ultrasonic transducers (410 PMUT). Exemplary embodiments of the 400 ESUA is an N row×M column lattice of PMUTs capable of supporting 3D beamforming on transmission and reception.

With multiple 400 ESUA and appropriate amplitude, phase and/or time delay, and frequency steering, a 3D standing acoustic pressure wave pattern may be sculpted for multiple purposes including stirring and particle transport with movement of a pressure gradient null, or pressure gradient trap, along a desired trajectory.

One or more 1D or 2D 400 ESUA may be positioned in the vicinity of the electrolyte between the 205 nanopore separator and 206 SEI on the negative electrode (anode). The one or more 400 ESUAs may be phase coherent. The ESUAs 400 generate propagating ultrasonic pressure waves through the electrolyte volume. Amplitude, phase and/or time delay, and frequency steering may be applied to each array to form standing wave foci at specified 3D locations within the electrolyte volume. Steering vectors are calculated so that a pressure node, or acoustic pressure trap, may be formed at one or more foci with a steep 3D pressure gradient surrounding the foci. A small particle, e.g. Li-ion cations, experiences a 3D force vector proportional to the negative pressure gradient at the particle location. The result is particle motion in the direction of the negative pressure gradient.

Acoustic stirring is the iterative update of the steering vectors to move the foci and resulting 3D pressure field to sweep the 3D electrolyte volume. The steering vector locates each focus and resulting pressure field incorporating near and far field propagation losses, attenuation, and reflected energy from high acoustic impedance boundaries such as battery canister walls, electrolyte/SEI 206/Anode 203 interface, and nanopore separator 205. SEI disruption can initiate dendrite growths. Accordingly, the foci and pressure gradients are generally located away from the SEI 206 to minimize SEI 206 disruption.

Imaging Dendritic Growths

Exemplary methods for 3-D imaging to estimate dendritic location, morphology, and growth are disclosed. One or more monostatic or multi-static ESUA 3D sonars 401 and 402 are used to generate high definition 3D images in both the near and far-fields. Generally, each sonar transmits a short pulse to facilitate time of flight range estimation. The 2D ESUA 400 aperture forms a 3D transmit beam with associated electronics to control amplitude, phase and/or time delay, and frequency steering across the 2D array. For reception, element level receivers are followed by sampling and downstream digital coherent signal processing.

The image voxel dimensions are functions of beamwidth (2/N radians by 2/M radians) for an N by M array of the 410 PMUTs, and bandwidth. As an example, consider an ESUA 3D sonar with a PMUT designed for a 100 MHz ultrasound carrier. The array is a lattice arrangement of 25 elevation by 100 azimuth PMUTs with a 6 micron ($\lambda/2$) pitch. PMUTs are typically capable of 25% bandwidth, which may result in an imaging system for the single ESUA 3D sonar has a 3D beamwidth of 4.6° in elevation, 1.15° in azimuth with a 24 micron range resolution.

Other realizations of the ESUA 400 with a PMUT N×M array is a sparse array with $2\sqrt{N}$ elements in a column and $2\sqrt{M}$ elements in a row. The elements may be positioned so that after convolution, or time domain multiple-in and multiple-out (MIMO), and azimuth to elevation association, the effective spatial resolution is equivalent to the fully populated N×M array.

Figure 3:
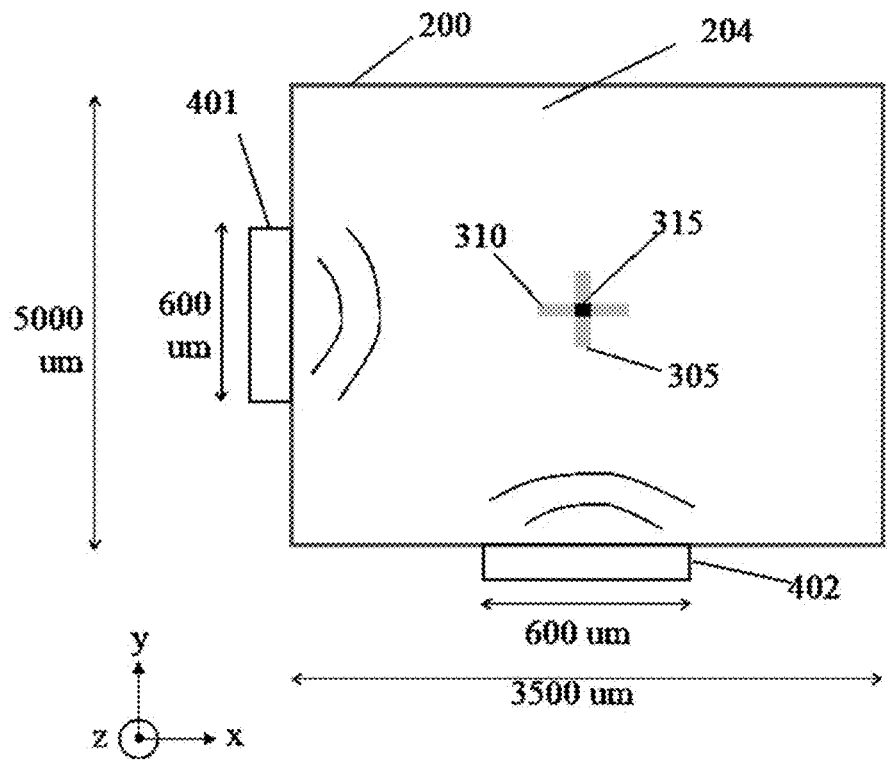
FIG. 3 shows exemplary embodiments with two multistatic 2D arrays positioned on orthogonal walls of the battery cell.

As shown in FIG. 3, in various embodiments, two multistatic ESUA sonars, 401 ESUA (L) and 402 ESUA (F) may be positioned on orthogonal walls of the 200 battery cell with a common field of view (FOV) of the 204 electrolyte. The positioning exploits multistatic trilateration to enhance spatial resolution. Each ESUA 401 and 402 is a 25 by 100 PMUT array (150 by 600 microns), capable of 25% bandwidth on a 100 MHz ultrasound carrier frequency. The 305 center voxel in the FOV will have dimensions of (x,y,z)=(24, 35, 140) microns (um) as seen from the 401 ESUA (L), while the 310 center voxel has dimensions (x,y,z)=(50, 24, 200) microns as seen from the 402 ESUA (F). After joint processing of both arrays, the system's 315 center voxel has dimensions (x,y,z)=(24, 24, 140) microns.

Some pouch batteries can have a larger electrolyte FOV in the (x,y) plane, typically dimensions are (x,y)=(35, 50) mm. For these configurations' multiple smaller arrays, or subarrays of a larger contiguous conformal array, may be positioned along or inside the battery cell walls to obtain a joint resolution enhancement.

The morphology of dendritic growths varies from needle-like straight and kinked structures with diameters <1 micron to bulky moss-like structures spanning tens of microns. While the imaging apparatus example shown in FIG. 3, whose center voxel dimensions of (24,24,140) microns are not sufficient to resolve the morphology of the smaller individual dendritic growths, estimation of the change in dendritic growth is observed by measuring the change in backscatter energy. When voxels are filled with dendrites more energy is reflected compared to empty voxels.

Preemptive Detection of Internal Short Circuits and Battery Shutdown

Battery cell failure and worse, electrolyte ignition may occur when dendrites pierce the nanopore separator with a dendrite bridge from anode to cathode. The imaging system detects the onset of early and late stage dendritic growths. When the imaging system detects dendritic growths in the vicinity of the nanopore separator or other structure in the cell, the processor may assert a state change indicating an eminent internal short circuit condition. Detection of a close proximity event by the 1300 PCNBIR ASIC triggers the processor to configure both the 1040 switch and the 1050 switch to the open position to isolate the battery from both the load and charging circuits disconnecting the battery from the load, shutting down the battery and preventing a destructive short circuit condition. The processor may also communicate the state change of the external switch from closed to open, as well as provide warnings of an approaching state change, to an external display or device to notify a user of the device employing the battery power system.

Inducing Failure in Dendritic Growths

Methods to induce dendrite mechanical failure, by causing a physical and electrical disconnection, or detachment, of a lithiated deposit growth from the negative electrode, are described. The methods integrate charging current density and its modulation with oscillating acoustic pressure gradients to shear, or detach, dendrites and other deposits from the anode and/or solid electrolyte interface.

Dendrite and Deposit Growths

Figure 4:
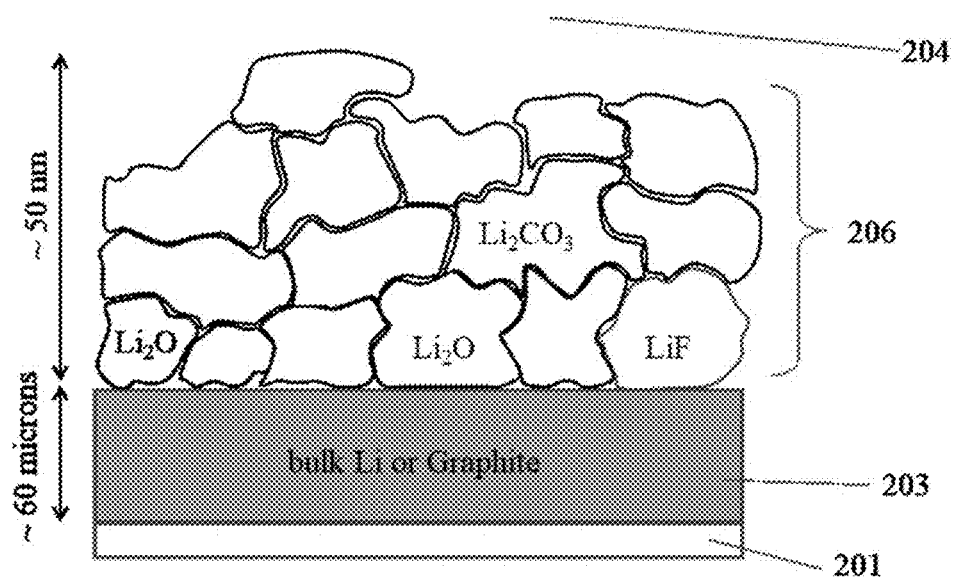
FIG. 4 depects an example of the solid electrolyte interphase.

The ideal lithium metal battery has an absence of non-uniform lithiated growths, i.e., dendrites, at the negative electrode (anode). In application, as shown in FIG. 4, the solid electrolyte interphase (SEI) layer 206 formed between the anode 203 and the electrolyte 204 during the first charge cycle as illustrated is typically a heterogenous multiple phase of reduced salts and inorganics dependent on both anode and electrolyte composition.

During subsequent charge cycles, positively charged lithium ions also migrate toward the negative electrode passing through pores in the SEI. The accumulation of lithium at the negative electrode increases anode pressure. A disruption in the SEI due to anode pressure and/or local non-isotropic electrochemical conditions may induce a local accumulation of lithium deposits.

The lithium electrodepositions have different morphologies and growth rates dependent on charging current densities and local electrolyte salt concentration gradients. Three primary morphologies are whisker-like, moss-like, and thin needle-like stalks.

Each morphological class is associated with a range of current densities. The current densities for each morphological class are delineated relative to the diffusion-limited current density, $J_D$, where $J_D$ is a function of the battery system.

At low charging current densities, $J_a < J_L$, where $J_L < J_D$, an SEI induced pressure breakage frequently induces a whisker-like growth from the anode. In the salt rich electrolyte an SEI also forms on the whisker blocking penetration of the separator. At elevated charging current densities, $J_L < J_a < J_D$, bulbous, kinked whisker, with dense moss-like growths from the anode become widespread but typically do not reach the nanopore separator.

Figure 5:
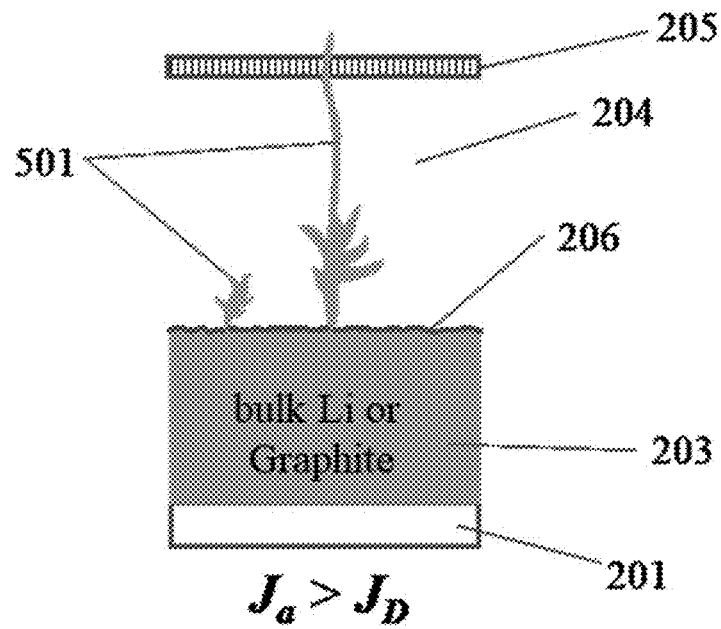
FIG. 5 shows an exemplary morphology of dendrites growing in a salt depleted electrolyte at high charging current density.

At high charging current densities, $J_a > J_D$, the salt depleted electrolyte results in rapid, up to hundreds of nanometers per second, dendritic growths manifesting as the 501 thin stalks, tree like structures with thin blades and sharp tips growths without an SEI coat, as shown in FIG. 5. The skinny, almost needle-like, crystalline lithium pillars can penetrate a solid polymer or ceramic electrolyte and pierce through the nanopore separator reducing the battery cell's Coulombic and energy efficiency. Worse, when the growth forms a bridge between negative electrode and cathode, the cell short-circuits leading to thermal runaway, potential ignition of the electrolyte, and battery failure.

Strong Dendrites and Weakening Methods

Electro-deposited crystalline lithium pillars with submicron diameter are strong with an average yield stress 16 MPa at room temperature, much higher than bulk lithium's yield stress of <900 kPa at room temperature.

Lithium's shear modulus is a function of the diameter, size, and crystallographic orientation and temperature. By briefly manipulating the current density profile so that, $J_L < J_a < J_D$ dendrite morphologies are formed with more defects or disorder in their crystallographic orientations, with frequent kinking. The kinked dendrites are mechanically weaker than the crystalline needle-like lithium growths. The result is a reduction of yield stress levels approaching that of bulk lithium at room temperature, <900 kPa.

Heating further reduces the dendrite's modulus. At elevated temperatures, defect kinked laden growths soften with more susceptibility to plastic deformation. As an example, lithium bulk foil has a creep stress of >500 kPa at 298 K which reduces to 350 kPa at 400 K.

Two methods are simultaneously used to elevate dendrite temperature: one, Joule heating; and two, acoustic energy transfer. Joule heating is obtained by briefly elevating the charging current density. As an example, in a Li—Li symmetrical coin cell battery, a current density of 15 mA/cm2 produced a temperature increase of 40 to 60 ° C.

Figure 6:
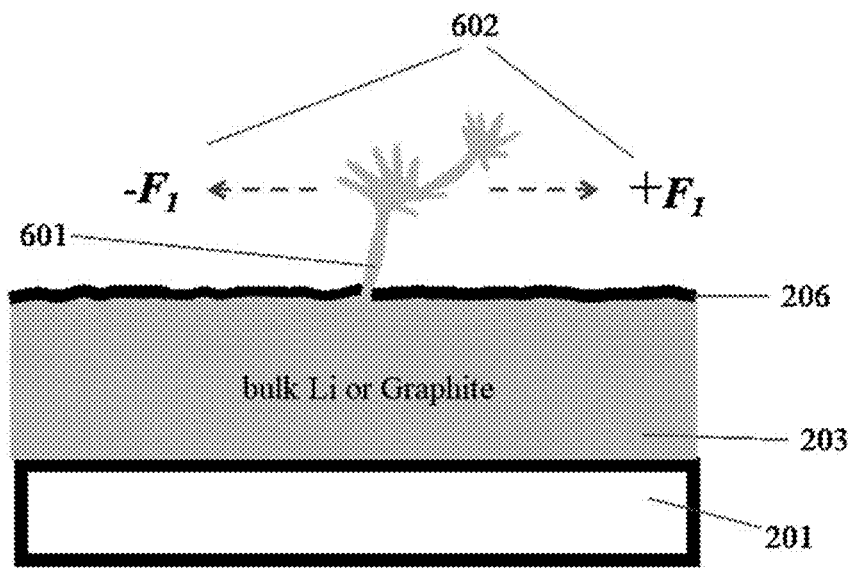
FIG. 6 shows a dendrite subjected to antipodal forces.
Figure 7:
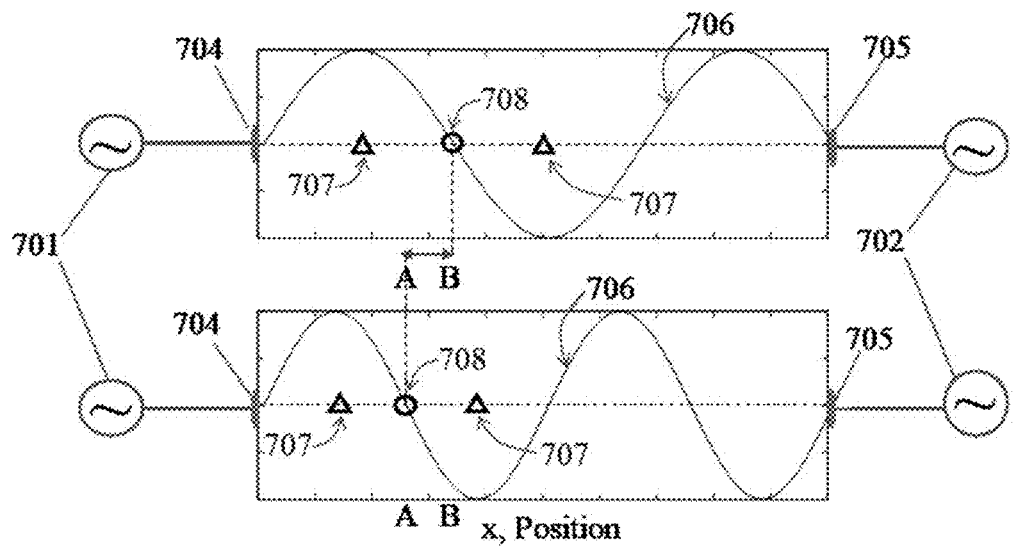
FIG. 7 shows standing wave pressure nodes and antinode change positions when the frequency is changed.

As depicted in FIG. 6 and FIG. 7, acoustic energy transfer is realized by subjecting the actively growing dendrite 601 to oscillatory acoustically generated pressured gradients with antipodal forces. A trap surrounded by pressure gradients may be formed by acoustically generated standing waves. Oscillating pressure gradients are then realized by oscillation of the trap position. The standing wave pressure null is positioned in the vicinity of the one, or more active dendrites 601. Then the pressure null location is moved so that the full pressure gradient is repeatedly swept back and forth across the dendrite's fixed location. The alternating pressure gradient creates forces 602 that lead to a plastic deformation in the dendrite 601 with heat production.

FIG. 7 shows example configurations for local acoustic stirring, or oscillation of an acoustic trap. One 704 PMUT is positioned on the battery cell's left interior wall, another 705 PMUT is positioned on the battery cell's right interior wall, both faces immersed in the 204 electrolyte with directivity oriented towards each other through the electrolyte. The 701 oscillator drives the 704 PMUT and the 702 oscillator drives the 705 PMUT. The 701 oscillator has frequency $f_{L1}$ and phase $\theta_{L1}$ while the 702 oscillator has frequency $f_{R1}$ and phase $\theta_{R1}$.

Local acoustic stirring is obtained by sweeping the 701 oscillator frequency from $f_{L1}$ to $f_{L2}$, where $f_{L2} > f_{L1}$ with the 702 oscillator frequency and phase locked with the 701 oscillator frequency and phase. The 706 acoustically generated standing pressure wave has the 707 pressure anti-nodes and 708 pressure nodes.

At $f_{L1}$ the pressure at position A in the electrolyte is high relative to position B, so the region between AB experiences a pressure gradient or force along AB. At $f_{L2}$, the pressure at position A is low relative to position B so the region between AB experiences a pressure gradient or force along BA. During a sweep from $f_{L1}$ to $f_{L2}$ a dendrite located at $x=(A+B)/2$ experiences a force first along AB then along BA as the pressure node moves from B to A. Another one of many variants of local acoustic stirring maintains the frequencies, $f_{L1}=f_{R1}=f_{L2}=f_{R2}$ and but changes only the 702 oscillator phase $\theta_{L1}=\theta_{R1}=\theta_{L2}<\theta_{R2}$.

Dendrite shear failure, a mechanical disconnection, or detachment, from the negative electrode, occurs when the shear modulus of the weakened kinked temperature softened dendrite falls below the forces generated by the alternating pressure gradients. As an example, a 450 kPa pressure gradient can be formed in the vicinity of a focal point in water with a suitable PMUT array in transmission at 10 MHz.

The sheared, or disconnected, dendrite contributes to the pool of lithium deposits that are no longer electrically and electrochemically coupled to the bulk lithium negative electrode. The latter comprise the so-called dead lithium, or more generally, dead metal.

Dead Metal Accumulation and Movement to Graveyard

Dead lithium is also formed during the normal charge/discharge or lithiation plate/strip cycle. During the discharge cycle, with lithium dissolution back into the electrolyte, some growths may thin sufficiently to cleave electrically and mechanically from the negative electrode. The disconnection turns active lithium growths into dead lithium.

Figure 8:
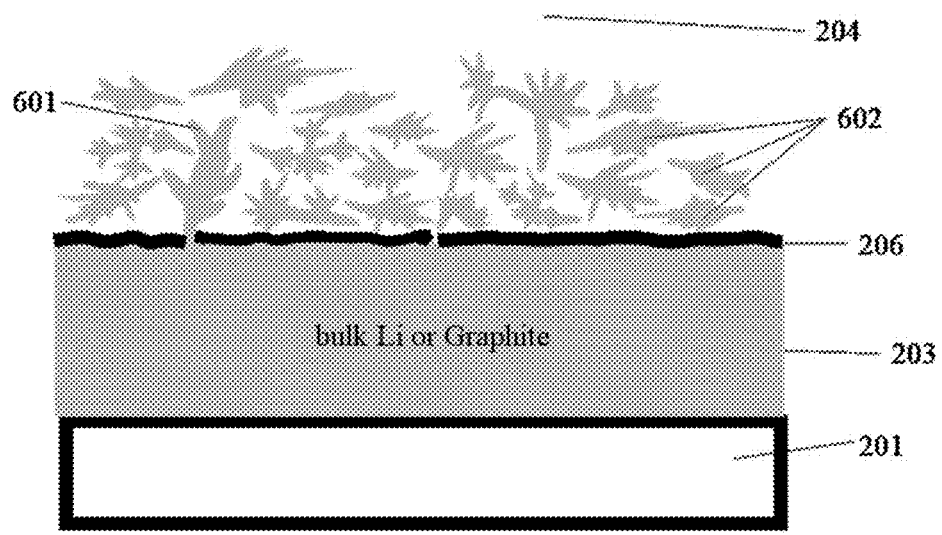
FIG. 8 depicts an illustration of dead lithium accumulation.

FIG. 8 illustrates dead lithium accumulation in which dead lithium 602 creates a convoluted, or tortuous, path for lithium ions to travel through to reach the underlying 206 SEI during the charge cycle. With successive layering of dead lithium during each charge/discharge cycle, the ion diffusion coefficient is reduced. A consequence is that an ion concentration gradient is formed limiting voltage charging range with a reduction in battery cell capacity.

Another aspect of the present invention involves methods that moves the 602 dead lithium to a location to reduce the loss of battery cell capacity. One location for the 901 graveyard is the outer edge of the negative electrode near the SEI/battery case transition.

Acoustic 3D traps are used to capture a subset of the dead lithium disconnected from the negative electrode. The acoustic trap is a 3D acoustic pressure null surrounded by high pressure with a steep pressure gradient in each space-dimension. One or more of the multistatic 400 ESUAs are used to sculpt and locate the 3D pressure trap on the disconnected dead lithium to be moved. An obstruction free 3D trajectory to the sidewall edge is calculated from acoustic multistatic 3D imaging. The 3D trap position is moved along the trajectory to the graveyard along an obstruction free path. The trajectory's time profile accounts for particle drag in the 204 electrolyte viscosity.

Figure 9:
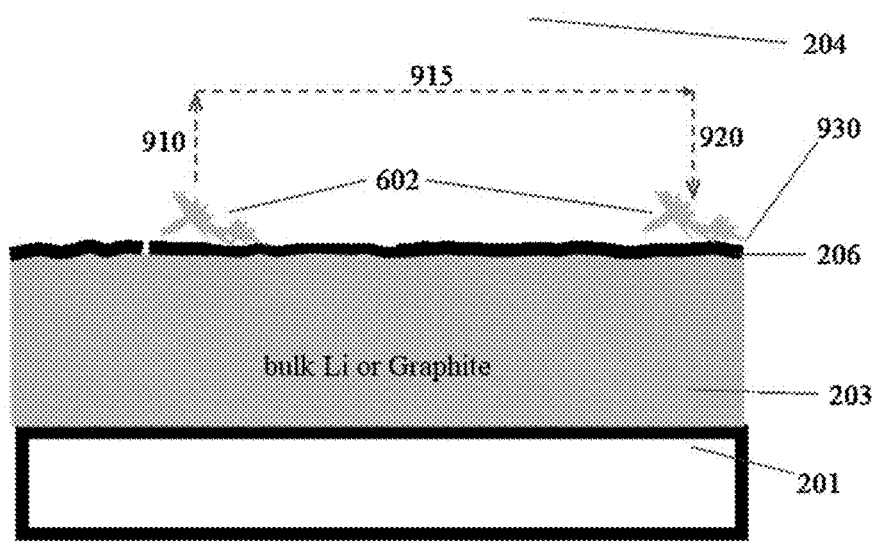
FIG. 9 depicts an exemplary transport path to move dead lithium to a graveyard.

Exemplary methods for transport of a dead lithium particle to a graveyard or edge of the battery cell are shown in FIG. 9. A 3D acoustic trap, or pressure node, is formed in the vicinity of the 602 dead lithium particle then moved away from 206 SEI on the 910 path to minimize disturbance to the SEI, transported along the 915 obstruction free path in the 204 electrolyte, and then moved along the 920 path toward the 930 graveyard located at the edge between the 206 SEI and battery cell wall.

Figure 10:
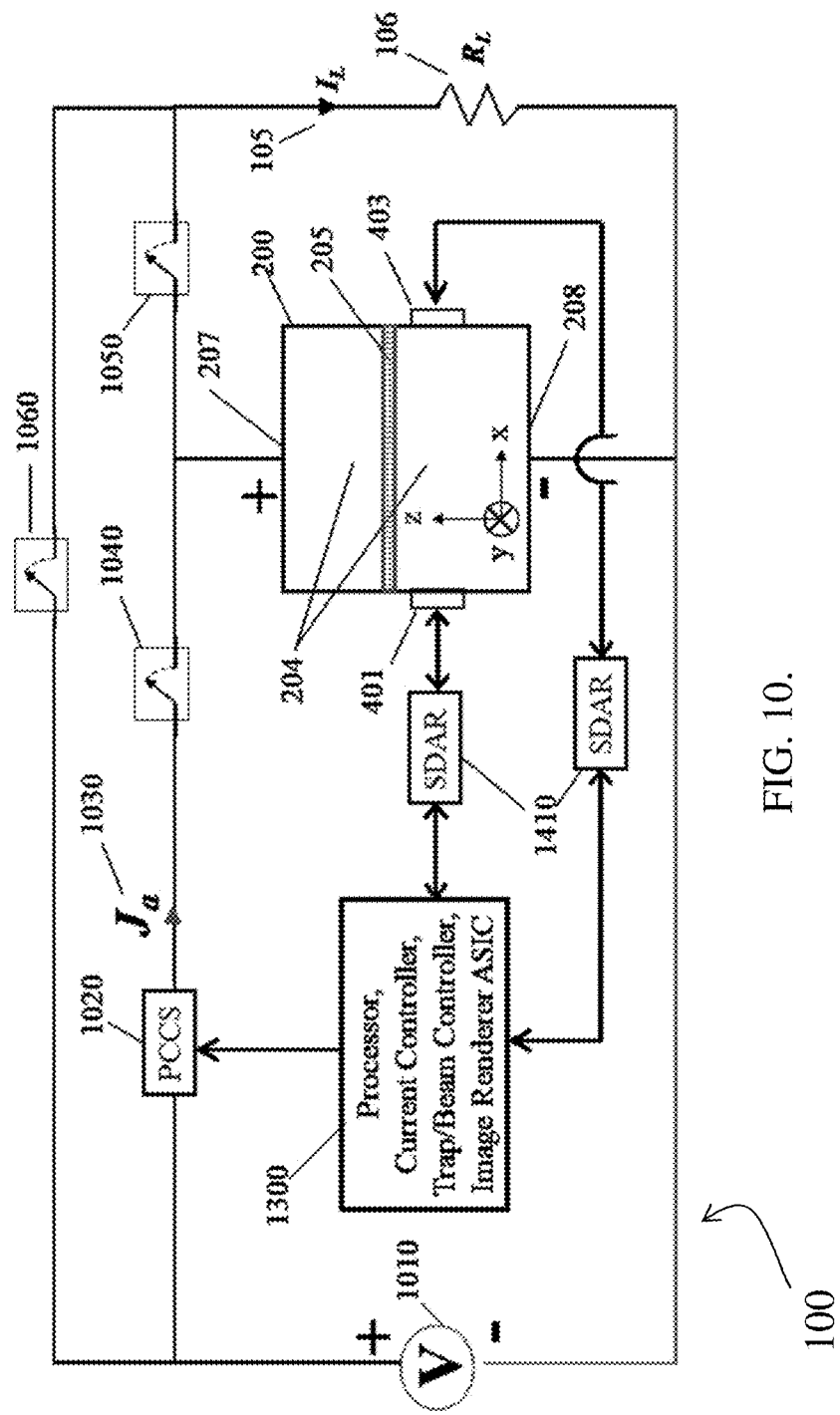
FIG. 10 shows exemplary battery power systems embodiments.

Exemplary embodiments of the battery system 100 including battery 200 during cell charging are shown in FIG. 10. The 1010 external supply provides power to the system. A 1020 programmable constant current source (PCCS) sources the 1030 proportional current density $J_a$ through the 1040 closed switch to the 207 positive terminal of the 200 battery cell with the 1050 switch in open position to isolate the 106 load from the cell. The 1060 switch may be closed to supply external power to the 106 load. The 1020 PCCS accepts real time set points commands from one or more processors 1300, which serves as a current controller, trap/beam controller, and image renderer (PCNBIR), which may be implemented in one or more ASICs. Two ESUA sonars, the 401 ESUA (L) and the 403 ESUA (R) are coupled to the 200 battery cell interior wall in the region between the 205 nanopore separator and the 206 negative electrode. Each ESUA has analog interfaces with a 1410 software defined acoustic radio (SDAR). Each 1410 SDAR is controlled by and returns data to the 1300 PCNBIR ASIC.

Figure 11:
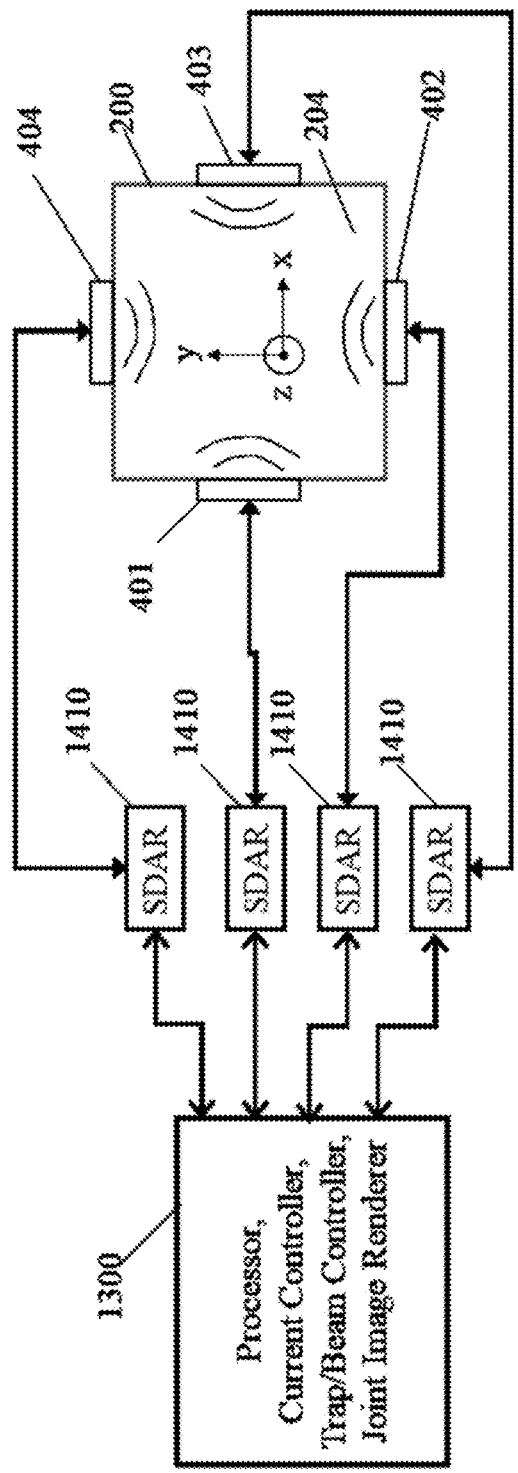
FIG. 11 shows exemplary embodiments with four electronically steered ultrasonic 2D arrays positioned on four opposing walls.

Other embodiments may couple four 400 ESUA apertures (Left, Right, Front, Back), to the 200 battery, as shown in FIG. 11. The 200 battery, top view looking down in the -z direction from the 205 nanopore separator into the 204 electrolyte toward the 206 SEI coated 203 negative electrode. The four 401 ESUA (L) 402 ESUA (F) 403 ESUA (R) and 404 ESUA (B) are coupled to the electrolyte 204 through an impedance matching layer in the battery wall. All four ESUAs are controlled by phase coherent signals from four separate 1410 SDARs. The four, phase coherent, ESUAs create acoustic pressure waves in the electrolyte forming standing wave patterns with pressure nodes and antinodes.

The 1410 SDAR may have two transmission modes, and one receive mode. One transmission mode is to support formation of an acoustic trap, or pressure null, to wiggle, break, and capture dead lithium at a specified 3D position in the electrolyte. The second transmission mode supports sonar 3D imaging of dendritic growths and dead lithium by forming a high gain beam with low sidelobes at a specified azimuth and elevation angle with a short transmit pulse. The receive mode of the SDAR 1410 supports sonar 3D imaging to detect and observe morphological changes in live and dead lithium deposits on the 203 negative electrode. The joint 3D image product across all 1410 SDARs is formed by image rendering logic inside the 1300 PCNBIR ASIC.

Figure 12:
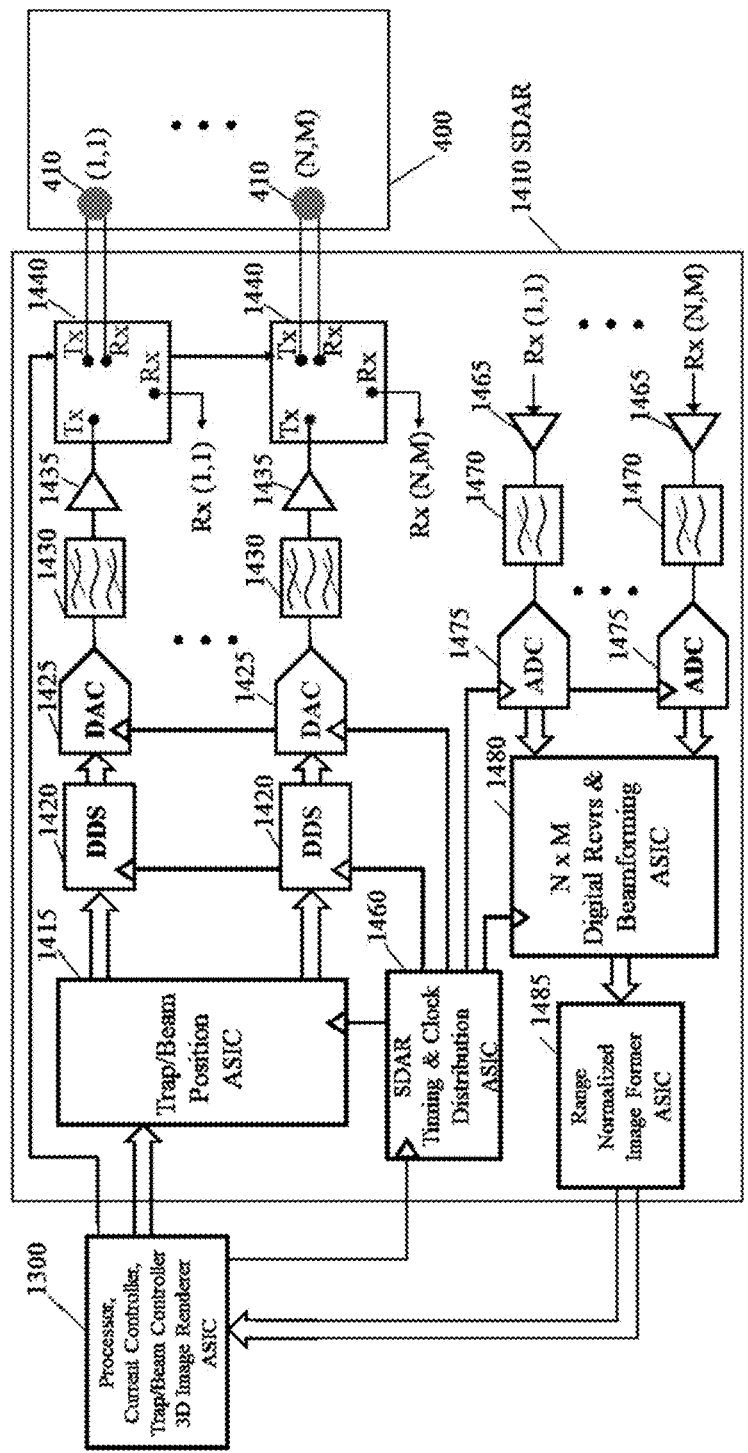
FIG. 12 shows exemplary embodiments of the software defined acoustic radio.

Exemplary embodiments of the 1410 SDAR are shown in FIG. 12. To form an acoustic trap at a specified location, the 1300 PCNBIR ASIC issues digital words containing the 3D trap position, 3D trap width, and trap duration, to the 1415 Trap/Beam Position ASIC within the 1410 SDAR. The 1415 Trap/Beam Position ASIC calculates the triplet of amplitude, phase and/or time delay and frequency steering vector for each of the N×M 410 PMUTs as well as the transmission period. These quantities are passed to a 1420 direct digital synthesizer (DDS) to generate the corresponding digital time domain waveform. The digital output of the 1420 direct digital synthesizer (DDS) drives a 1425 digital to analog converter (DAC) generating an analog time domain signal with the amplitude, phase and/or time delay, and frequency that originated from the 1415 Trap/Beam Position ASIC. The analog signal is filtered by the 1430 bandpass filter, and then increased in power by the 1435 amplifier. The power boosted signal enters the 1440 switch on the 1440 switch's Tx input port. The Trap/Beam Controller inside the 1300 PCNBIR ASIC has set the 1440 Switch in transmit mode providing a matching impedance low loss path between the 1440 Switch Tx input port and the 1440 Switch Tx output port. The result is a low loss path between the 1435 amplifier and the Tx input port of the PMUT(1,1) of the 400 ESUA. The PMUT's piezoelectric membranes flex in response to the time varying voltage signal generating a propagating acoustic pressure wave in the 204 electrolyte.

Methods to support imaging may employ a high gain beam with low sidelobes. The same hardware and similar methods are employed. The difference is that the Beam Control function inside the 1300 PCNBIR ASIC specifies azimuth and elevation angles along with pulse width and pulse repetition interval as digital words passed to the 1415 Trap/Beam Position ASIC. The latter calculates the amplitude, phase and/or time delay and frequency steering vector with transmission pulse width for each of the N×M PMUTs to obtain the designated azimuth and elevation angle beam position. The latter quantities configure each of the 1420 DDS's to generate a digital time domain waveform. The latter is converted to a short pulse analog time domain waveform by the 1425 DAC, then 1430 bandpass filtered, and power boosted by the 1435 amplifier which is coupled to the Tx input port of the PMUT(1,1) by the 1440 Switch set to transmit mode with resulting PMUT pressure wave generation in the 1204 electrolyte.

For either transmission mode, the N×M PMUTs may be driven with their own unique steering components of amplitude, phase and/or time delay, and frequency. The digital and analog time domain waveforms may be made phase coherent with a common 1410 SDAR clock from the 1460 SDAR Timing and Clock Distribution ASIC coupled to the 1420 DDS and 1425 DAC. The result is that the N by M PMUTs form a space and time domain phase coherent pressure wave propagating into the electrolyte 204.

The 1460 SDAR Timing and Clock Distribution ASIC conditions and distributes the timing and the primary oscillator clock signals originating from the 1300 PCNBIR ASIC. The timing signals may include a transmit pulse envelope, and pulse repetition interval start/stop envelope.

During reception to develop 3D images the 1300 PCNBIR ASIC sets the 1440 Switch in the 1410 SDAR into the receive configuration. The receive configuration couples the Rx port from PMUT(1,1) to the Rx(1,1) port through an impedance matched low loss path to an input of the 1465 low noise amplifier. An output of the amplifier may be low pass filtered by a 1470 low pass filter, then digitized by the 1475 analog to digital converter (ADC). A digital stream is passed from the ADC 1475 to one or more digital receivers inside a 1480 N×M digital receiver and beamforming ASIC. The digital receiver 1480 forms a phase and amplitude estimate for each sample. In this same manner the N×M PMUT receive signals may be sampled simultaneously presenting amplitude and phase measurements to the digital beamformer. The digital beamformer multiplies the N×M received measurement matrix by a matched filter matrix forming N elevation beams by M azimuth beams for each time sample. The 1485 range normalized image former ASIC estimates the norm of each of the N×M beam sample to estimate signal magnitude. The data is converted from spherical to cartesian coordinates, collected across all time/ranges associated with the FOV and converted to a 3-D range normalized image matrix.

Referring to FIG. 12, the 1300 PCNBIR ASIC may calculate a non-coherent 3D image product from the collection of 3-D range normalized image matrices returned from each 1410 SDAR and their associated 400 ESUAs. Each 400 ESUA may have a different view of the 204 electrolyte FOV. The result may be a joint image product with a higher 3D resolution and contrast ratio than provided by any single 400 ESUA. The processor 1300 may use the 3D images to locate dendrite growths and plan the trap positions and obstruction free trajectories.

Other embodiments reduce or increase the number of ESUAs, their shapes, and their locations. The number of ESUAs can vary from unity to a high count. The ESUAs may also be conformal arrays positioned inside or outside the battery cell. They may be positioned on the current collector side of the anode or cathode, or external to the battery cell, or inside the battery wall adjacent to the electrolyte separating the 206 SEI and 205 nanopore separator. Ultrasonic reflective or absorptive materials that are electrochemically neutral may be used to alter pressure wave propagation characteristics to promote sculpting of the acoustic pressure field with pre-calculated steering vectors at each PMUT. These alternative embodiments and other variants will be readily apparent to those skilled in the art as reviewing this description.

Figure 13:
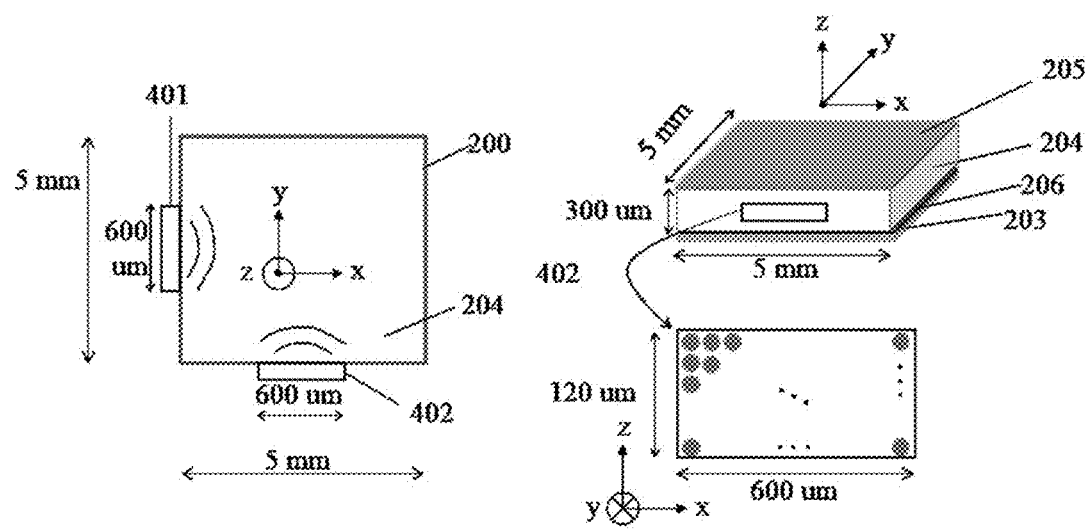
FIG. 13 shows exemplary embodiments with two electronically steered ultrasonic 2D arrays positioned on orthogonal walls.
Figure 14:
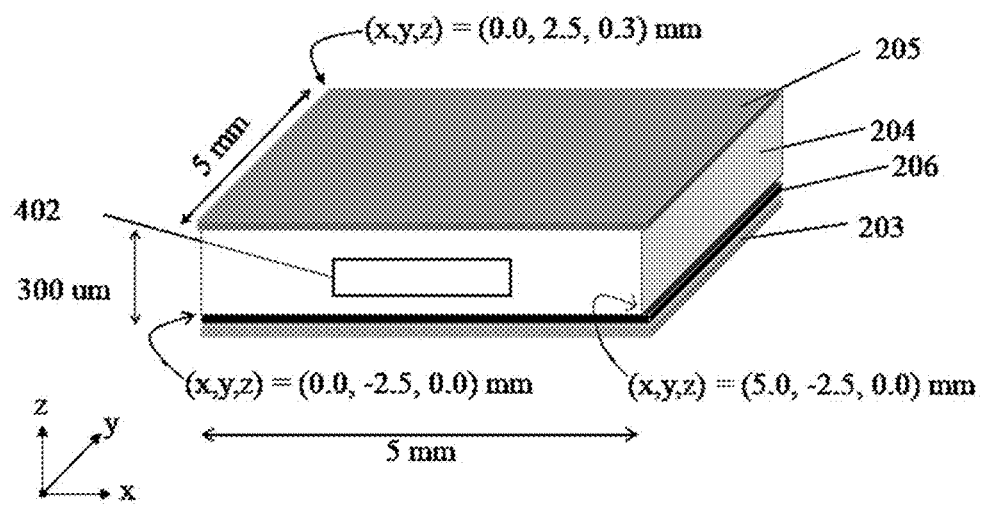
FIG. 14 is a closeup perspective view of the geometry and field of view for two array configuration embodiments.

Exemplary embodiments employing only two 400 ESUAs are shown in FIG. 13. The FOV may be 300 um in height (z), 5 mm (x), and by 5 mm (y). The two ESUAs may be centered on the sidewalls of the battery cell with at least one face immersed in the electrolyte 204. In this example, the ESUA 400 face geometry may be 120 um in height by 600 um in x or y with a fully populated 2D array of 20 by 50 PMUTs in elevation (z) and azimuth (x or y). The two ESUAs may operate at 100 MHz center frequency to generate acoustic pressure waves in the electrolyte and form standing wave patterns with pressure nodes and antinodes. An exemplary closeup of the ESUA geometry and FOV of the electrolyte volume between the 204 nanopore separator and 206 SEI layer on the 203 negative electrode for a nominal pouch style battery cell is depicted in FIG. 14.

Trap Formation and Positioning Methods

Different types of trap pressure morphologies assist acoustic stirring, dendrite flexure for energy transfer and shear failure, and particle movement. Non-local acoustic stirring is efficient with a broad pressure null to sweep the full FOV. Likewise moving a large volume of suspended particles with a broad pressure null is also efficient. On the other hand, steep gradients have both pressure and force advantages with localized dendrite flexing to induce dendrite failure. The spatial containment of a steep and narrow pressure trap accommodates isolation of, and movement of, free particles suspended in smaller volumes.

Many methods are available for calculating the steering vector for a desired trap position. Various methods involve finding a near-field steering vector for each ESUA that results in a zero-magnitude phasor at the desired trap position. A virtual omni-directional single wavelength emitter with a fixed phase and desired magnitude may be placed at trap's 3D location. The virtual complex pressure signal may be propagated, backward, through the environment, including attenuation, spreading losses and multipath, to each PMUT. The unweighted steering complex phasor for a specific PMUT has a phase equal to the conjugate of the path phase change and magnitude as the reciprocal of the path loss magnitude normalized by the number of PMUTs. The steering vector across all PMUTs may be calculated as the Hadamard product of the unweighted steering vector with an apodization weight vector whose mean has been set to zero.

Figure 15:
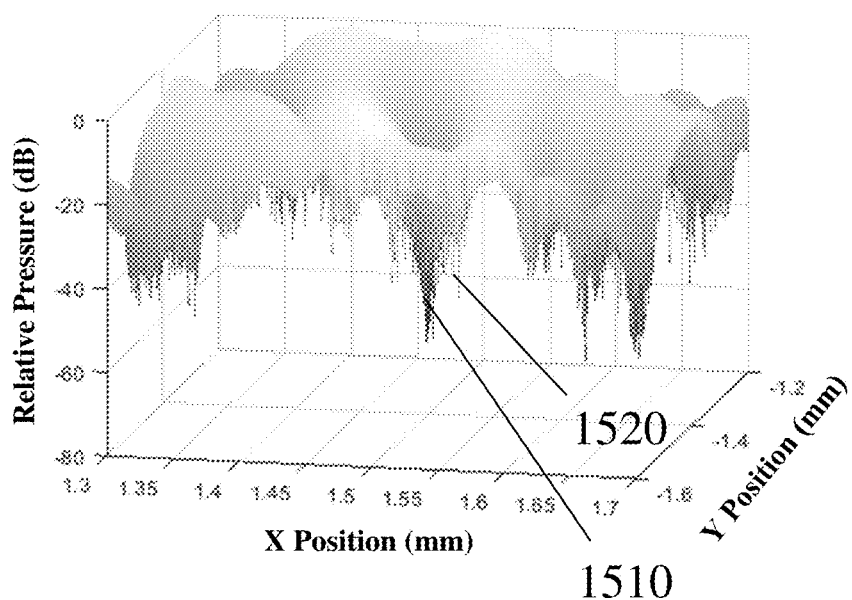
FIG. 15 depicts a local 2D pressure field of a narrow pressure trap.

An example of the 2D pressure field with the 1510 narrow trap is shown in FIG. 15. The 1501 trap is positioned at (x, y, z)=(1.5, −1.4, 0.0) mm for the system shown in FIG. 14. These methods typically produce a steep and narrow pressure gradient surrounding the trap position but has some undesirable 1520 local minima in the trap neighborhood.

Figure 16:
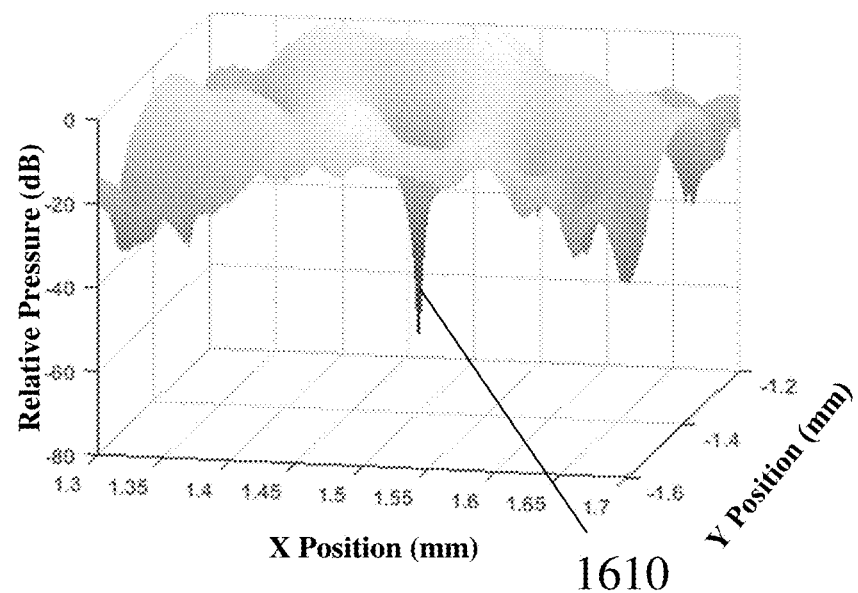
FIG. 16 depicts a local 2D pressure field of a narrow pressure trap obtained after 5 fast time phase offsets.

Other methods may be used to reduce the nearby local minima and artifacts. For example, a common mode phase shift offset, as a function of fast time relative to particle drag, may be applied across the full steering vector for some, but not all, of the ESUAs, such as ESUA (F) 402. The non-coherent relative pressure associated with the magnitude average over 5 random phase offsets, shown in FIG. 16, has a substantial reduction in local minima and artifacts with negligible changes to the 1610 trap position, steepness, and depth.

One or more wide, or variable volume, traps may be generated using adaptive beamforming techniques to form arbitrarily wide nulls in a filled beam space for each ESUA. First a desired trap region is defined. Next a collection of azimuthal and elevation main lobe beam angles required from each ESUA to cover the trap region are estimated. Each beam angle inside the trap region has at least one associated trap steering vector. Next fill beam angles, the complement of the trap beam angles, and their associated steering vectors are calculated. The total steering vector is the product of the inverse covariance of the sum of the trap beam steering vectors times the sum of the fill beam steering vectors.

The 3D intersection of the trap, or null beam widths, between two or more ESUA arrays, subject to the propagation environment, defines the 3D trap dimensions. Propagation may include include multipath, spreading losses, and attenuation effects, if desired.

Figure 17:
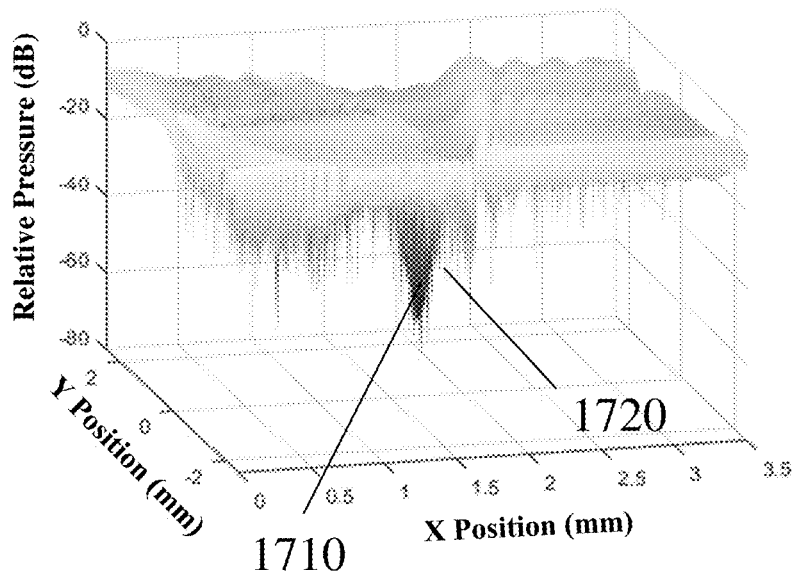
FIG. 17 depicts a local 2D pressure field of a wide pressure trap.

An example of the 2D pressure field with the 1710 wide trap is shown in FIG. 17. The center of the wide acoustic trap may be positioned at (x, y, z)=(2.0, 1.0, 0.0) mm for the system shown in FIG. 14.

These methods may have 1720 local minima and artifacts in the vicinity of the wide trap. A previously described a common phase shift offset as a function of fast time relative to particle drag may be applied to the steering vector for only the 402 ESUA (F) to reduce unwanted minima and artifacts.

Figure 18:
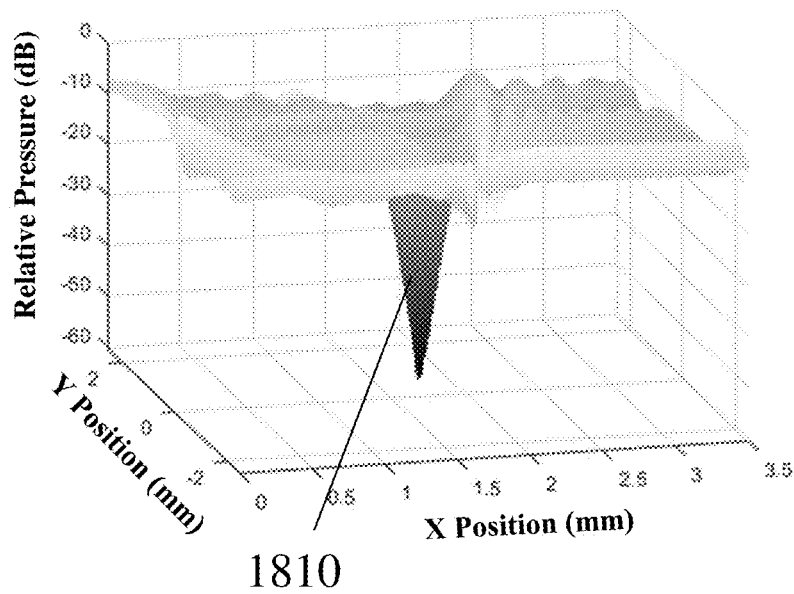
FIG. 18 depicts a local 2D pressure field of a wide pressure trap obtained after 10 fast time phase offsets.

Non-coherent relative pressure associated with the magnitude average over 10 phase offsets is shown in FIG. 18. A substantial reduction in local minima and artifacts has negligible changes to the 1810 trap position, breadth, and depth.

Example Embodiment of Trap Wiggle

Dendrite flexure may be facilitated by wiggling or oscillating the trap position. In fast time, the wiggle may be implemented with sinusoidal frequency modulation (SFM). The SFM may be realized by passing sinusoidal $\Delta$FM parameters ($\Delta$Hz and $\Delta$T, $\Delta$FM=$\Delta$Hz/$\Delta$T) from the 1415 Trap/Beam Position ASIC to the 1420 DDS. The 1420 DDS calculates the voltage for the time dependent instantaneous frequency and outputs a sinusoidal FM time domain digital waveform at the DDS's sample rate to the 1425 DAC. An analog waveform output by the DAC 1425 may be filtered and amplified before transduction by the PMUT to pressure waves.

Figure 19:
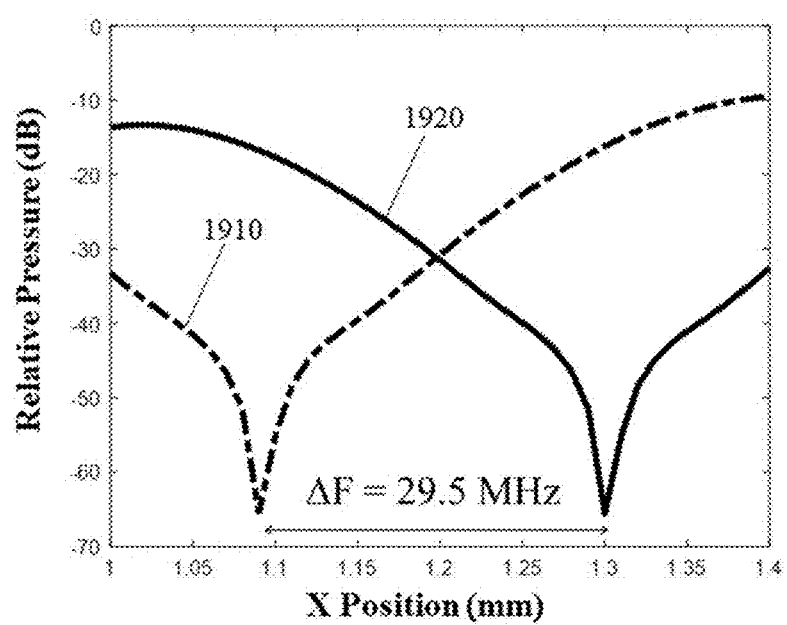
FIG. 19 depicts an example of pressure trap movement by frequency modulation.

An example of wiggle or oscillation of the acoustic trap position by SFM is shown in FIG. 19. The trap is centered at (x,y,z)=(1.203, −0.204, 0) mm. A 29.5 MHz bandwidth on an 85.22 MHz center frequency in the ESUA (F) oscillates the wide acoustic trap by 200 microns in the x-dimension. FIG. 19 also shows the 1910 trap position at 100 MHz and the 1920 trap position at 70.5 MHz.

Figure 20:
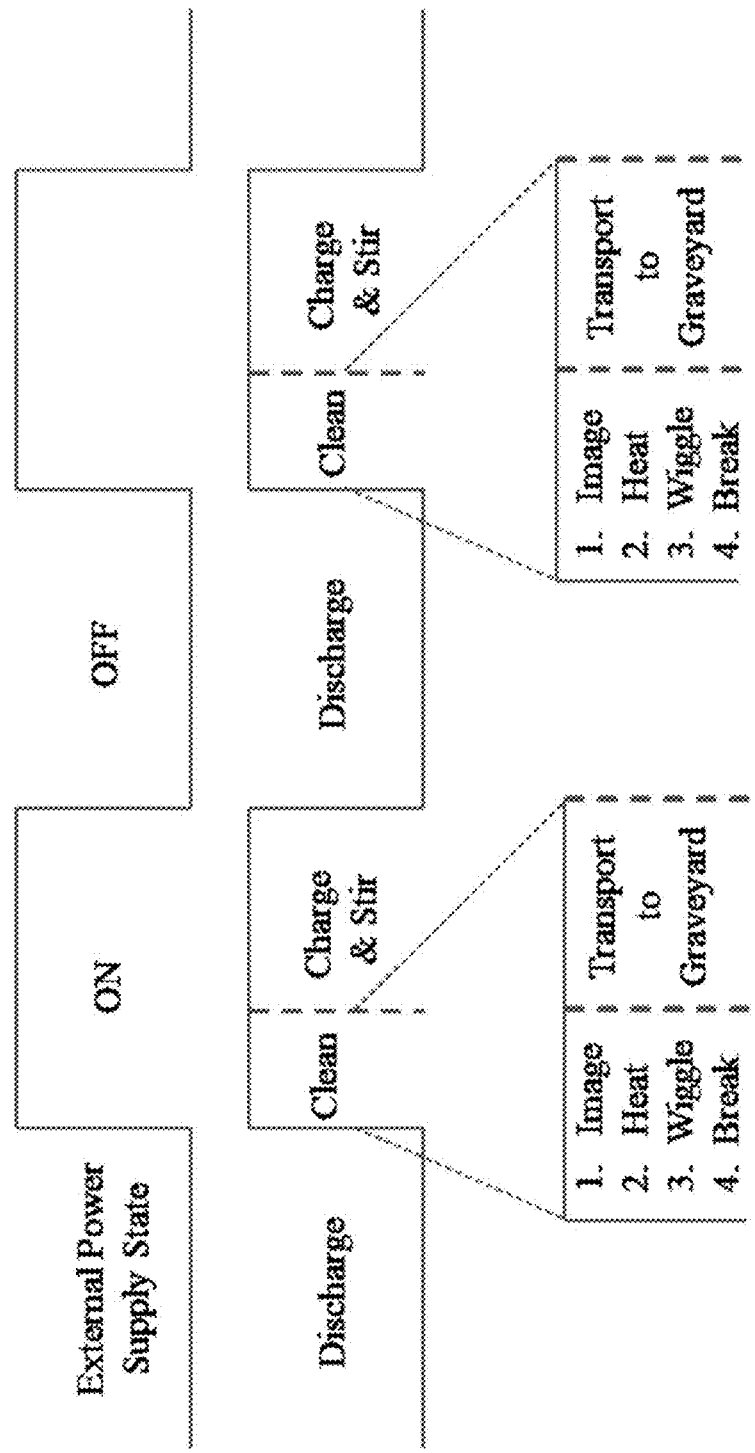
FIG. 20 is an exemplary timing diagram for the cleaning and charge/stir cycling.

Acoustic stirring and clean cycling may be activated when external power to the battery system is present. A 2010 clean cycle may be initiated first, followed by the nominal 2020 charge cycle with simultaneous acoustic stirring as depicted in FIG. 20.

At the completion of a discharge cycle, electrodepo sits have been stripped and thinned and are susceptible to Joule heating and energy transfer. The onset of external power, sensed by the 1300 PCNBIR ASIC, triggers the start sequence of the 2010 clean cycle.

Figure 21:
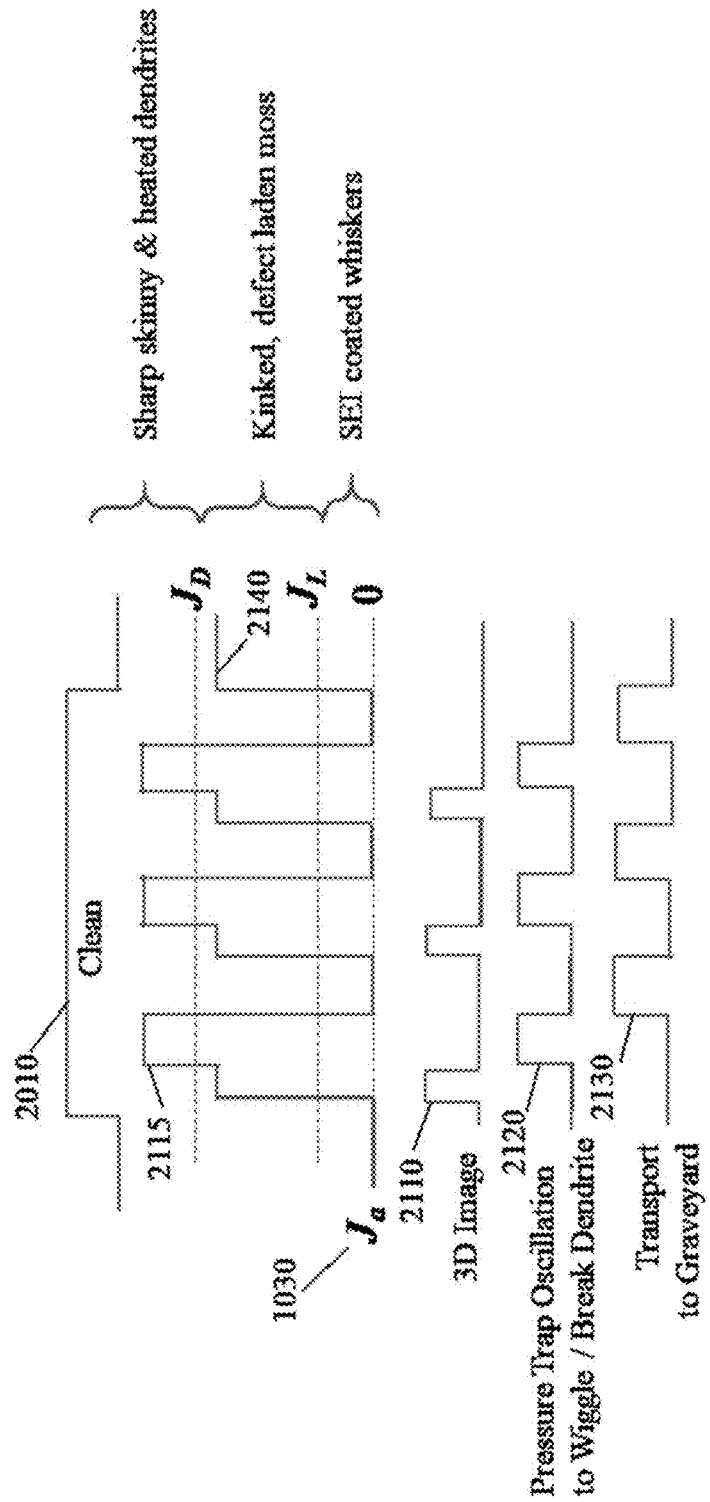
FIG. 21 is an exemplary timing diagram coordinating current density, 3D imaging, pressure trap oscillation, and free particle transport.

First the 1300 PCNBIR ASIC sets the 1050 switch to open to isolate the 106 load from the battery cell followed by closing the 1040 switch to couple the 1020 PCCS to the 207 positive terminal of the battery cell. Next 3D imaging is performed to identify local 3D volumes to clean. Sub-regions may be prioritized based on backscatter returns correlated with dendrite density. During the 2110 imaging sub-cycle, as shown in FIG. 21, the 1030 charging current density, $J_a$, may be set so that $J_L<J_a<J_D$, to promote kinked, defect laden and weakened moss-like dendrite growths. Next the current density may be briefly 2115 increased to $J_a>J_D$, to Joule heat the dendrites resulting in temperature-induced softening of the dendrite. Simultaneous with the Joule heating, a narrow deep pressure trap 2120 may be oscillated at the area being cleaned. After a prescribed time, the current density may be zeroed and a wide pressure trap 2130 may be employed to capture and transport broken dendrites, dead-lithium and other particles to the graveyard. This process may be repeated until all the problem areas have undergone a clean cycle or for a fixed or variable duration at fixed or variable time intervals.

After clean cycle completion a charge/stir cycle may be commenced by setting the current density so that $J_a<J_D$. Simultaneously, a wide trap region may be swept over the full volume between the nanopore separator and SEI/anode surface to acoustically stir the electrolyte 204. Stirring may be performed during the charge cycle to promote electrolyte electrochemical isotropy, which is meant to minimize the likelihood of dendritic growth initiation.

In view of the present description, one of skill in the art should be able employ many embodiment variations of the disclosed systems, apparatuses, and methods to achieve various objectives.

The imaging mode may be used to sense dendrite proximity to the nanopore separator. Detection of a close proximity event may be used to trigger an external switch to isolate the battery from the load and charging circuits.

A sparse imaging mode may be exploited to compensate for dendrite blockages of monostatic or multistatic 400 ESUA arrays. Convolution, or time domain MIMO, between geographically diverse sparse subarrays, with Boolean association, may be used to select subarrays of the 400 ESUA array that are not blocked. Similarly, geographically diverse subarrays are selected to exploit multipath effects, such as reflections from the battery cell wall, to see around blockages.

Figure 22:
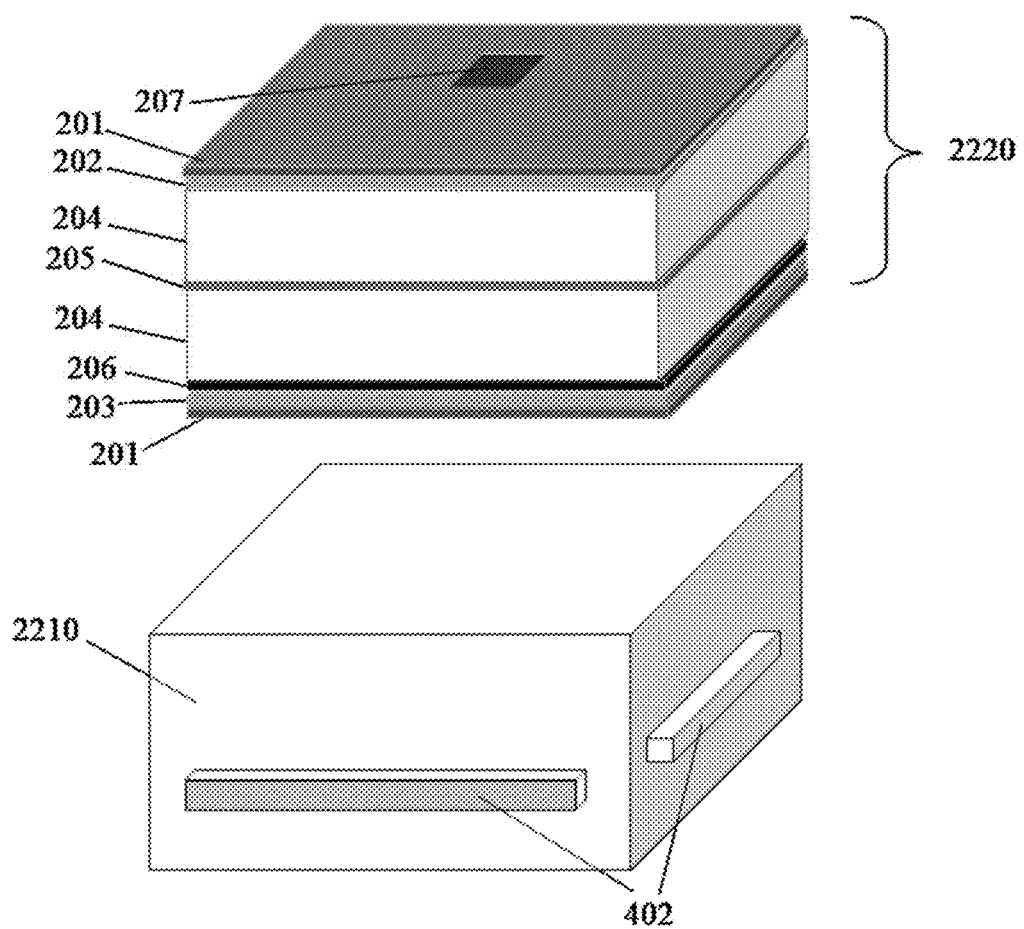
FIG. 22 shows exemplary embodiments utilizing an external open box to mount two electronically steered ultrasonic 2D arrays.

Other embodiments may position multiple, or conformal, 400 ESUA on an external surface outside the battery cell. In FIG. 22, two 400 ESUAs are mounted to a mounting structure 2210 that places the ESUAs 400 in close proximity to the battery cell 2220. Each 400 ESUA has acoustic impedance matching to couple acoustic energy through the structure 2210, through the battery cell wall and into the 204 electrolyte. This embodiment minimizes changes to the battery cell itself, reducing manufacturing costs. For example, the system 100 with the structure 2210 may be implemented in mobile phones, computers, and other devices and vehicles without changing the battery design. In addition, the system 100 may be implemented in charging stations for existing and new battery designs.

Other lower cost embodiments of the present invention may be envisioned by one of ordinary skill in the art. For example, the imaging function may be eliminated entirely from the system. Instead each area of the anode undergoes a cleaning cycle for a fixed duration, independent of the presence or absence of dendritic growths. This reduces the gate count in the 1410 SDAR ASIC and software complexity in the 1300 PCNBIR ASIC. In addition, the transducers in the ESUA may be CMUTs instead of PMUTs. Acoustic stirring, anode cleaning, and dendrite failure methods may also be combined with other techniques to reduce dendrite initiation and growth and facilitate dendrites removal. For example, other methods include, electrolyte composition and additives that minimize dendrite initiation and growth, and promote defects in crystalline growths to lower their shear moduli. Scaffold/mesh E-field sculpting may be employed to align the orientation of dendritic growths in one plane to simplify coupling with oscillating force resonance.

The disclosed apparatus and method are applicable to any battery cathode/anode liquid electrolyte system that exhibits charge cycle electrodeposition on the anode. For example, the present invention may be employed with battery systems based on lithium, potassium, sodium, magnesium, copper, or zinc ions. Anode types include bulk lithium, graphite, graphite combined with silicon-metal alloys such as $SiO_x$, $TiO_x$, and $NiO_x$, and transition metal oxides such as $Cr_2O_3$, $MnO_2$, $Fe_2O_3$, $Co_3O_4$, CuO. Cathodes types include lithium nickel cobalt manganese oxide (NMC), lithium iron phosphate (LFP), lithium nickel manganese spinel (LNMO), lithium nickel cobalt aluminum oxide (NCA), lithium manganese oxide (LMO), and lithium cobalt oxide (LCO).

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Various elements of the system may employ various levels of photonic, electrical, and mechanical integration. Multiple functions may be integrated on one or more ASICs or modules.

Processors may range, for example, from general-purpose processors and CPUs to field programmable gate arrays (FPGAs) to application specific integrated circuit (ASICs). Software modules (executed on hardware) may be expressed in a variety of software languages (e.g., computer code), including C, C++, Java™, Javascript, Rust, Go, Scala, Ruby, Visual Basic™, FORTRAN, Haskell, Erlang, and/or other object-oriented, procedural, or other programming language and development tools. Computer code may include microcode or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more". Furthermore, as used herein, the term "set" is intended to include one or more items and may be used interchangeably with "one or more". Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A battery system comprising:
  a battery including
    at least one cell containing an electrolyte;
    a cathode at least partially exposed to the electrolyte in the cell with an electrical connection to outside the cell;
    an anode at least partially exposed to the electrolyte in the cell with an electrical connection to outside the cell and separated from the cathode by the electrolyte;
  at least one current source electrically connected to the anode and cathode to provide current for charging the battery;
  at least one electronically steered ultrasonic array (ESUA); and
  a processor to:
    control the at least one current source to modulate the current relative to a charging current for the battery to vary a morphology of at least one dendrite growing on the anode to promote dendrite failure without melting the dendrite, and
    control the at least one ESUA to transfer acoustic energy to the at least one dendrite growing on the anode via at least one acoustic pressure trap proximate the at least one dendrite to induce failure of the at least one dendrite.

2. The battery system of claim 1, where:
the processor is further to:
  control the at least one ESUA to produce acoustic stirring of electrolyte.

3. The battery system of claim 2, where:
acoustic stirring is produced by controlling the at least one ESUA to vary the acoustic pressure gradient in the electrolyte.

4. The battery system of claim 1, where:
the at least one pressure trap is proximate the anode.

5. The battery system of claim 1, where:
at least one of the pressure traps is produced proximate a wall of the cell to induce transport of at least one failed dendrite toward the wall.

6. The battery system of claim 1, where:
the at least one pressure traps is produced by producing a corresponding acoustic pressure null.

7. The battery system of claim 1, where:
the processor is further to:
  control the at least one ESUA to produce an acoustic pressure gradient between a first location proximate the anode and at least one of the pressure traps proximate a wall of the cell.

8. The battery system of claim 1, where:
the at least one current source is controlled to induce dendrite failure by Joule heating.

9. The battery system of claim 1, where:
the at least one current source is controlled to promote dendrite failure by producing a current density to promote at least one of structural defects and kinks in the dendrite to produce lower shear moduli.

10. The battery system of claim 1, where:
the at least one ESUA is controlled to produce acoustic energy transfer by oscillation of a pressure trap formed with steep pressure gradients proximate the anode.

11. The battery system of claim 1, where:
the processor further controls the at least one ESUA to image electrodeposits and growths on and proximate to the anode.

12. The battery system of claim 11, where:
the image includes at least one of estimated dendritic location, morphology, and growth.

13. The battery system of claim 11, where:
the processor is further to:
control the at least one ESUA to produce an acoustic pressure gradient based on the image.

14. The battery system of claim 11, where:
the processor is further to:
control the at least one ESUA to produce an acoustic pressure gradient to provide a transport path to a dead lithium graveyard based on the image.

15. The battery system of claim 1, where:
the processor is further to:
control the at least one current source to adjust charging current to the cathode to promote defects and kinking in crystalline growths.

16. The battery system of claim 1, where:
the processor is further to:
control the at least one current source to adjust charging current to the cathode to induce Joule heating and dendrite temperature softening.

17. The battery system of claim 1, where:
the processor is further to:
control the at least one ESUA to induce dendrite failure and dendrite transport prior to charging.

18. The battery system of claim 1, where:
the processor is further to:
control the at least one ESUA to use adaptive beamforming to make arbitrarily wide null beams by multistatic intersections of the null beams.

19. The battery system of claim 1, where
the anode is comprised at least one of bulk lithium, graphite, graphite combined with silicon-metal alloys such as $SiO_x$, $TiO_x$, and $NiO_x$, and transition metal oxides such as $Cr_2O_3$, $MnO_2$, $Fe_2O_3$, $Co_3O_4$, and CuO, and
the cathode is comprised of at least one of lithium nickel cobalt manganese oxide (NMC), lithium iron phosphate (LFP), lithium nickel manganese spinel (LNMO), lithium nickel cobalt aluminum oxide (NCA), lithium manganese oxide (LMO), and lithium cobalt oxide (LCO).

20. The battery system of claim 1, further comprising:
a nanopore separator positioned between the anode and the cathode,
the at least one electronically steered ultrasonic array (ESUA) is positioned between the nanopore separator and the anode, and
the at least one current source supplying charging current to cathode.

21. The battery system of claim 1, where
the at least one electronically steered ultrasonic array (ESUA) is positioned outside the cell.

22. The battery system of claim 1, further comprising
an external switch electrically connected between the anode and the cathode external to the cell, where
the at least one processor controls the opening and closing of the external switch.

23. The battery system of claim 1, where
the at least one processor controls the opening and closing of the external switch based on dendrite growth.

24. A power system comprising:
a battery including
at least one cell containing an electrolyte;
a Li-based cathode at least partially exposed to the electrolyte in the cell with an electrical connection to outside the cell;
a Li anode at least partially exposed to the electrolyte in the cell with an electrical connection to outside the cell and separated from the cathode by the electrolyte;
a nanopore separator positioned between the anode and the cathode in the cell;
at least one programmable constant current source (PCCS) positioned between an external power supply and cathode to adjust current provided to the cathode to charge the battery;
at least one electronically steered ultrasonic array (ESUA) is positioned to provide acoustic energy proximate the solid electrolyte anode interface proximate the anode;
an external switch in electrical connection to open and close a circuit connecting the cathode to the anode;
at least one processor to control
the at least one PCCS to
modulate the current relative to a charging current for the battery to vary a morphology of at least one dendrite growing on the anode to promote defects and kinking in crystalline growths of the dendrite on the anode, and
elevate the current briefly above the charging current to induce Joule heating and temperature softening of the at least one dendrite without melting the dendrite,
the at least one ESUA to:
transfer acoustic energy to the solid electrolyte interface proximate the at least one dendrite via at least one acoustic pressure trap to induce shearing of the at least one dendrite from one of the anode and solid electrolyte interface,
produce acoustic stirring of the electrolyte,
image dendrite growth on and proximate to the anode, and
produce an acoustic pressure gradient to transport sheared dendrites away from the anode toward a wall of the cell, and,
the opening and closing of the external switch.

25. The battery system of claim 1, where
the at least one current source is a programmable constant current source (PCCS).

26. The battery system of claim 1, where
the at least one ESUA includes at least two geographically diverse ESUAs; and
the processor controls the at least two ESUAs to generate a broad pressure null from intersecting acoustic energy beams formed by the at least two geographically diverse ESUAs.

27. The battery system of claim 1, where
the at least one ESUA includes at least two ESUAs; and
the processor controls the at least two ESUAs to form an acoustic trap with sparse local minima using common mode phase shift offsets.

28. The battery system of claim 1, where
the at least one ESUA includes at least two ESUAs; and
the processor controls the at least two ESUAs in a sparse imaging mode to compensate for dendrite blockages.

29. The battery system of claim 1, where
the at least one ESUA includes at least two ESUAs; and
the processor controls the at least two ESUAs to provide 3D images of dendrites within at least one voxel.

* * * * *